United States Patent [19]

Zupancic et al.

[11] Patent Number: 4,627,859
[45] Date of Patent: Dec. 9, 1986

[54] FACILITATED GAS ENRICHMENT MEMBRANE COMPOSITES AND A PROCESS FOR THE PREPARATION THEREOF

[75] Inventors: Joseph J. Zupancic, Bensenville; Raymond J. Swedo, Mount Prospect, both of Ill.

[73] Assignee: Allied Corporation, Morristown, N.J.

[21] Appl. No.: 702,172

[22] Filed: Feb. 15, 1985

[51] Int. Cl.$^4$ ............................................. B01D 53/22
[52] U.S. Cl. ...................................... 55/158; 210/490; 264/45.1
[58] Field of Search ................... 55/16, 158; 210/638, 210/490, 491, 500.2

[56] References Cited

U.S. PATENT DOCUMENTS

| | | | |
|---|---|---|---|
| 2,966,235 | 12/1960 | Kammermeyer | 183/115 |
| 3,276,996 | 10/1966 | Lazare | 210/500.2 X |
| 3,526,588 | 9/1970 | Michaels et al. | 210/23 |
| 3,767,737 | 10/1973 | Lundstrom | 264/41 |
| 3,844,735 | 10/1974 | Steigelmann et al. | 55/16 |
| 3,892,665 | 7/1975 | Steigelmann et al. | 210/490 |
| 4,132,824 | 1/1979 | Kimura et al. | 428/220 |
| 4,155,793 | 5/1979 | Salemme et al. | 156/246 |
| 4,192,824 | 3/1980 | Robinson et al. | 585/409 |
| 4,214,020 | 7/1980 | Ward et al. | 210/500.2 X |

FOREIGN PATENT DOCUMENTS

2649543  12/1977  Fed. Rep. of Germany ... 210/500.2

OTHER PUBLICATIONS

Reversible Oxygenation of Cobalt(II) Complexes on Polyvinylpyridine, Bull. Chem. Soc. Japan, 42 (1969).
The Oxygenation-Deoxygenation of Cobalt(II) Complexes on Polymers, Bull. Chem. Soc. Japan, 42 (1969).
Reversible Oxygenation of Heme Bound to Polyvinylpyridien and Polyvinylimidazole, Biopolymers, vol. 13 (1974).
Adsorption of Molecular Oxygen by Polymer Covalently Bonded Co(II) Porphyrin Complex in Toluene—Biopolymers, vol. 17 (1978).
Metalloporphyrins in Polymeric Matrices and in Micelles, 2—Makramol Chem., 178 (1977).
Cobalt(II) Poly(Ethyleneimine) Membrane with Oxygen-Binding Ability, Makramol. Chem. Rapid Commun., 3, (1982).
The Transport of Oxygen Facilitated by a Cu'-Tetraethylenepentamine System, J. Chem. Soc., Chem. Commun., 1982.
Water-Soluble Polyphosphazenes as Carrier Molecules for Iron(III) and Iron(II) Porphyrins—J. Amer. Chem. Soc., 101 (1979).
Reversible Oxygen-Binding by the Heme-Mono-N-[-3-(1-Imidazolyl)Propyl]Amide Incorporated in a Coacervate—Makromol. Chem. Rapid Commun., 3 (1982).
Approaches to Artificial Macromolecular Oxygen Carriers, J. Macromol. Sci. Chem., A13 (1979).

*Primary Examiner*—Frank Spear
*Attorney, Agent, or Firm*—Thomas K. McBride; John F. Spears, Jr.; Raymond H. Nelson

[57] ABSTRACT

Facilitated gas enrichment membrane composites which are utilized in the separation of gases or gas enrichment of a gas mixture will comprise an organometallic compound which acts as a gas carrier interdispersed in an interpenetrating polymer network matrix. The network matrix which comprises the reaction product of an isocyanate-capped polymer physically entwined with a nitrogen-containing compound will be nonacidic and hydrophobic in nature.

22 Claims, No Drawings

# 4,627,859

FACILITATED GAS ENRICHMENT MEMBRANE COMPOSITES AND A PROCESS FOR THE PREPARATION THEREOF

BACKGROUND OF THE INVENTION

The use of semipermeable membranes for reverse osmosis or ultrafiltration processes is well known. For example, in a reverse osmosis process, high pressure saline water may be placed in contact with a semipermeable membrane which is permeable to water but relatively impermeable to salt. Concentrated brine and relatively pure water are separated thereby; the water may then be utilized for personal use such as drinking, cooking, etc.

It has now been discovered that certain membranes may also be utilized for the separation of various gases. The separation of a gas mixture utilizing a membrane is effected by passing a feed stream of the gas across the surface of the membrane. Inasmuch as the feed stream is at an elevated pressure relative to the effluent stream, a more permeable component of the mixture will pass through the membrane at a more rapid rate than will a less permeable component. Therefore, the permeate stream which passes through the membrane is enriched in the more permeable component while, conversely, the residue stream is enriched in the less permeable component of the feed.

This ability to separate gases from a mixture stream will find many applications in commercial uses. For example, gas separation systems may be used for oxygen enrichment of air, for improved combustion efficiencies and conservation of energy resources. Likewise, nitrogen enrichment of air may be applicable where inert atmospheres are required. Other applications for oxygen enriched gases may be improving selectivity and efficiency of chemical and metallurgical processes. Similarly, inert atmospheres such as may be provided for by this invention may also be utilized in chemical and metallurgical processes. Some other applications of gas separation would include helium recovery from natural gas, hydrogen enrichment in industrial process applications, and scrubbing of acid gases. Specific uses for oxygen enrichment of air would be breathing systems for submarines and other underwater stations, improved heart-lung machines, and other lung assist devices. Another specific application of a gas separation system would be in aircraft to provide oxygen enrichment for life-support systems and nitrogen enrichment for providing an inert atmosphere for fuel systems. In addition, oxygen enrichment air can be used in furnaces for more efficient combustion; catalytic oxidations of organic compounds, i.e., mercaptans, hydrocarbons, alcohols, aldehydes, etc., to name but a few. Likewise, gas separation systems may be used for environmental benefits, e.g., methane can be separated from carbon dioxide in waste gases for sewage treatment processes and oxygen enriched air can be produced to enhance sewage digestion.

Some thin film polymers have been reported in the literature. For example, U.S. Pat. No. 3,892,665 discloses a membrane and a method for producing these membranes. In this patent, a thin polymer film is formed on the surface of a liquid, generally water, and is subsequently transferred to the surface of a porous supporting membrane. During the transfer of the thin polymer film, the porous support is maintained in a wetted stage with the liquid. In addition, the thin film can also be formed on the surface of the porous membrane if the surface of the support is first wet with the transfer liquid. This then means that the pores of the support member must be filled with liquid and, therefore, the liquid must be removed from the porous support at a period subsequent to the formation of the film in order to draw the film onto the support. In general, the thin polymer film of the reference consists of a monomolecular layer which is formed on the surface of the water wherein the individual film-forming monomer and/or polymer chains are oriented and closely packed. Subsequently, the oriented monomolecular layer or film, which is limited to a thickness in the range of from about 5 to about 25 Angstroms, is transferred to the surface of the porous support membrane. This process may be repeated until multiple monolayers are deposited on the surface of the support, the total film thickness then being from about 10 to about 200 Angstroms. Other than Van Der Vaal's forces, there is no bonding between the aggregate layers and the support. This means that the thin film of the finished membrane is weakly attached to the porous support and said membrane cannot withstand substantial back pressure when in operation. Obviously, this process is tedious and expensive and is not readily amenable to commercial use.

Another U.S. patent, namely U.S. Pat. No. 3,526,588, discloses a macromolecular fractionation process and describes a porous ultrafiltration membrane which is selective on the basis of pore size. In contradistinction to this, it is essential that the thin film membrane which is produced according to the process of the present invention is nonporous, so that gas separation operates by a diffusion-solution mechanism of transport. U.S. Pat. No. 3,767,737 which discloses a method for producing casting of "ultra-thin" polymer membranes is similar in nature to U.S. Pat. No. 3,892,665 in that the thin film of the membrane is formed on the surface of a liquid and transferred to the surface of a porous support membrane. The thin film polymer will thus inherently possess a disadvantage ascribed to the membrane of the former patent in that it cannot withstand substantial back pressure when in operation. In addition, U.S. Pat. No. 2,966,235 discloses a separation of gases by diffusion through silicone rubber which is not composited on a porous support material.

U.S. Pat. No. 4,155,793 involves a continuous method for the preparation of membranes by applying a polymer to a microporous support. However, the method of production described in this patent involves the spreading of a polymer casting solution onto the surface of a liquid substrate. The polymer which is utilized is not soluble in the liquid substrate nor is the solvent which is used compatible with the microporous support. The polymer film which constitutes the membrane is formed on the surface of the liquid and is thereafter applied to the microporous support. U.S. Pat. No. 4,132,824 discloses an ultra-thin film of a polymer composite which comprises a blend of a methylpentene polymer and an organopolysiloxane-polycarbonate interpolymer for a thickness less than about 400 Angstroms in which the interpolymer is present in an amount of up to about 100 parts by weight per 100 parts by weight of the methylpentene polymer. Likewise, U.S. Pat. No. 4,192,824 describes a method for preparing the aforementioned interpolymer by depositing on the surface of a liquid casting substrate a casting solution which comprises a mixture of methylpentene polymer and from 0 to 100 parts by weight of an organopolysiloxane-polycarbonate copolymer. The casting solution spreads over the surface of the liquid casting substrate to form a thin film following which at least a portion of the thin film is removed from the surface of the substrate. Thereafter, the film may be used in contact with a porous support as a gas separation membrane.

As hereinbefore set forth, the separation of various gases from a mixture thereof may constitute an important advance in commercial applications. This is becoming increasingly important in view of the necessity to conserve energy. A particular application would relate to increasing the thermal efficiency of combustion processes when utilizing fossil fuels in commercial combustion applications. Also, by utilizing a gas separation membrane in coal gasification, it may be possible to provide an oxygen enrichment of air for the production of low and medium British Thermal Unit (BTU) product gases as well as an oxygen enrichment of air for the combustion of these gases. For example, by placing a gas membrane separation system in close proximity to both gas production and gas combustion facilities, it would allow a site-located oxygen enrichment plant to supply both processes without the additional expense of transporting the gas or duplicating enrichment facilities.

As was hereinbefore set forth, membranes may be utilized for the oxygen enrichment of an atmosphere by facilitated transport means. The requirements for an efficient facilitating transport oxygen enrichment membrane include the characteristic of being thermally stable at ambient and above ambient temperatures, as for example, from 50° to 60° C.; the ability to withstand high pressures without physically destroying the membrane; being hydrolytically stable to water and/or water vapor and in a physical form which is adaptable for use as a thin film composite membrane in sheet form or as a coating to hollow fine fibers. As will hereinafter be shown in greater detail, we have now discovered that a gas enrichment membrane composite which comprises an organometallic carrier interdispersed in an interpenetrating polymer network membrane will possess all of the desirable characteristics hereinbefore enumerated.

Some prior work has been carried out in an attempt to find a gas enrichment membrane which will possess the desirable characteristics and which will possess sufficient stability to be used in gas enrichment processes for a relatively extended period of time. For example, an article in Bull. Chem. Soc. Japan, 42 (1969) examined the reversible oxygenation of Co(II) salcomines in a poly(4-vinylpyridine) matrix. However, although the oxygen carrier reacted reversibly with oxygen in the early stages, the membrane began to show irreversibility in later stages. Other articles which appeared in Biopolymers 13 and 17 utilized Co(II) and Fe(II) protoporphyrin as the oxygen carrier while the polymers include imidazole and pyridine based, poly(4-vinylpyridine), poly(N-vinyl-2-methyl imidazole), poly(4-vinylimidazole), etc. The article stated that the metalloporphyrin reacted reversibly with oxygen at subambient temperatures and showed irreversible oxidation above −20° C.

Further work in gas enrichment membranes was set forth in Makromol. Chem. 178 which discussed membranes comprising Fe(II) and Co(II) porphyrins in a polymeric matrix comprising poly(N-vinylimidazole-styrene). The preparation of these systems was accomplished first by preparing a homogeneous solution of the copolymer with the metalloporphyrin and by preparing terpolymers by the copolymerization of N-vinyl imidazole, styrene and hemin dimethylester. The membrane prepared according to the first method was found to have a weak interaction between the metalloporphyrin and the polymer, the system showing no stability to oxygen in solution inasmuch as an irreversible oxidation was observed. However, in solid state, the system was stable to oxygen for a relatively long period of time at ambient temperature. The membrane prepared according to the second method was found to contain the metalloporphyrin covalently bound to the polymer. When utilized in solution, the membrane system reacted reversibly with oxygen for two or three cycles and then showed irreversible oxidation. When utilized in solid state, the terpolymer system reacted reversibly with oxygen and displayed a stability for a relatively long period of time at ambient temperature. However, both of the systems possessed a disadvantage in that the systems had a slow adsorption and desorption rate in the solid state ($t_{\frac{1}{2}} \approx 20$ hrs).

Another article, Makromol. Chem. Rapid Commun., 3 described a membrane comprising Co(II) doped poly(ethyleneimine) in which the membrane was prepared by coating a crosslinked membrane from linear poly(ethyleneimine) with poly(epichlorohydrin) and exposing the film to a Co(II) chloride solution. No mention was made of the stability of the membrane over repeat cycles nor was the nitrogen permeability nor the oxygen selectivity determined. Other articles have shown that liquid membranes may be prepared. For example, an article in the J. Chem. Soc., 1982 showed a liquid membrane based on Cu(I) tetraethylenepentamine as a facilitated transport oxygen enrichment membrane. While the initial oxygen selectivity was relatively high on the first cycle, it rapidly decreased to a relatively low level on the second and third cycle. Other workers in the field described, Angew. Chem. Int. Ed. Engl., 16, how to prepare synthetic oxygen carriers which were soluble in aqueous systems. Such a polymer contained a distal imidazole, hemin and a hydrophobic pocket. The oxygen carrier mimic was based on a polyurethane prepared from poly(ethylene glycol). The polymer backbone was functionalized with histidine via peptide synthetic routes with a final addition of hemin, thus mimicking a distal histidine. The proximal imidazole was added to the hemin by a similar synthetic peptide route. The synthetic oxygen carrier showed reverse binding with oxygen, however it underwent irreversible oxidation after a few cycles. Other aqueous soluble oxygen carriers were described in J. Macromol. Sci. Chem. A13 and J. Amer. Chem. Soc., 101 in which an oxygen carrier was introduced directly into the backbone of the polymer or by incorporation to a pendent group of the parent polymer. The polymers were based on copolymers of styrene and N-vinyl imidazole in one instance with the membrane showing reversible oxygen binding with half life ranging from a few minutes to one day. In the other instance, water soluble polyphosphazenes were used as carriers for metalloporphyrin. While there is a strong complex between the oxygen carrier and the polymer solution, the system was found to irreversibly oxidize both in solution and in the solid state.

SUMMARY OF THE INVENTION

The present invention relates to facilitated gas enrichment membrane composites. More specifically, the invention is concerned with facilitated gas enrichment membrane composites and to a method for the preparation of these composites, the aforesaid composites possessing the desirable characteristics of a high selectivity and a high flux accompanied by a stability which will permit their use for a relatively long period of time.

It is therefore an object of this invention to provide a facilitated gas enrichment membrane composite. A further object of this invention is found in a process for the preparation of facilitated gas enrichment membrane composites which are commercially attractive for use due to the desirable characteristics which are possessed by said membrane composites.

In one aspect an embodiment of this invention resides in a facilitated gas enrichment membrane composite which comprises an organometallic gas carrier interdispersed in an interpenetrating polymer network matrix.

Another embodiment of this invention is found in a process for the preparation of a facilitated gas enrichment membrane composite which comprises dissolving a nitrogen-containing organic compound in an organic solvent, adding an organometallic gas carrier to the resulting solution at addition conditions, further admixing a solution of an isocyanate-capped polymer dissolved in an organic solvent with said solution of said nitrogen-containing organic compound and said organometallic gas carrier, casting the resultant admixture on a porous backing support material, removing said solvent, curing the resultant composite at an elevated temperature, and recovering the resultant gas enrichment membrane composite.

A specific embodiment of this invention resides in a facilitated gas enrichment membrane composite which comprises cobalt(II) tetraphenylporphyrin interdispersed in an interpenetrating polymer network matrix which comprises the reaction product of poly[methylene poly(phenylisocyanate)] physically entwined with poly(4-vinylpyridine-acrylonitrile).

Another specific embodiment of this invention is found in the process for the preparation of a facilitated gas enrichment membrane composite which comprises dissolving poly(4-vinylpyridine-acrylonitrile) in nitromethane, adding cobalt(II) tetraphenylporphyrin to the resulting solution at ambient temperature and atmospheric pressure, further admixing a solution of poly[methylene poly(phenylisocyanate)] dissolved in nitromethane with said solution of poly(4-vinylpyridine-acrylonitrile) and cobalt(II) tetraphenylporphyrin, casting the resultant admixture on a porous backing support material comprising polysulfone, removing said nitromethane solvent, curing the resultant composite at a temperature in the range of from about 30° to about 100° C. in an atmosphere which possesses a relative humidity in a range of from about 0 to about 100%, and recovering the resultant gas enrichment membrane composite.

DETAILED DESCRIPTION OF THE INVENTION

As hereinbefore set forth, the present invention is concerned with a facilitated gas enrichment membrane composite and to a method for the preparation thereof. By utilizing the particular type of membrane composite of the present invention in gas enrichment processes, it is possible to overcome the deficiencies which are present in the heretofore discussed composites, that is, the ability of the membrane composite to maintain a reversible oxidation reaction as well as a stability which enables the membrane to be used over a long period of time. As was previously discussed, the requirements for a gas enrichment membrane based upon a facilitated transport, especially in the case of oxygen enrichment membranes, include a metal complex which is coordinated with a nitrogen base of the type hereinafter set forth in greater detail, a hydrophobic environment with a corresponding low dielectric constant, a nonacidic environment and a polymeric matrix which isolates the metal complexes from each other in order to prevent irreversible oxidation. In addition, the metal complex which acts as an oxygen carrier must possess the ability to be stable to secondary reactions and, in addition, will reversibly react with oxygen. The polymeric matrix which is employed in the membrane composite of the present invention will comprise an interpenetrating polymer network, said network comprising a host polymer and a guest polymer. This polymeric network or system will form flexible and mechanically stable films which may be used as thin film composite membranes. By utilizing a thin film composite membrane, it is possible to take advantage of a number of favorable characteristics which are in contrast to asymmetric film membranes. One of the primary advantages which is afforded by the thin film composite membrane system is that it will require only a small quantity of high value polymers in the active film. This advantage is of particular importance in a facilitated transport membrane due to the fact that the quantity of the gas carrier as exemplified by the organometallic portion of the system which is required in membrane formation can be minimized. An additional advantage which is present in the thin film composite is that ultra-thin membranes can be prepared, thus resulting in high flux membranes inasmuch as, in gas separations, the thickness of the film directly relates to flux.

In preparing an effective facilitated gas enrichment membrane system, the organometallic complex, when in particulate form, must be isolated in nature, the particles being separated so that no interaction can take place. In addition, the polymeric matrix must also have an N-ligand present to aid in binding and to assure the reversibility of the action with the particular gas such as oxygen. The presence of this ligand in the polymeric matrix will serve to activate as well as stabilize the organometallic complex which acts as the gas carrier. By utilizing an interpenetrating polymer network of the type hereinafter set forth as the matrix in which the organometallic gas carrier is uniformly dispersed therethrough, it is possible to obtain gas enrichment membrane composites which will meet the desired requirements.

One component of the facilitated gas enrichment membrane composite of the present invention will comprise an organometallic gas carrier which, as hereinbefore set forth, must possess the ability to react reversibly with oxygen or other gases. The organometallic component will contain, as the metallic portion thereof, a transition metal preferably selected from the group consisting of cobalt, iron, manganese, iridium and rhodium. However, it is also contemplated within the scope of this invention that other transition metals such as zirconium, scandium, yttrium, lanthanum, copper, chromium, vanadium and titanium may also be employed, although not necessarily with equivalent results. The metallic portion of the organometallic component is complexed with an organic compound which comprises a porphyrin, phthalocyanine as well as derivatives and phosphrus complexes. Some specific examples of these organometallic compounds which may be utilized as one component of the gas enrichment membrane composite of the present invention will include tetraaryl organic complexes such as cobalt tetraphenylporphyrin, cobalt tetratolylporphyrin, cobalt tetraxylylporphyrin, cobalt tetraanisylporphyrin, cobalt tetramesitylporphyrin, cobalt tetra(chlorophenyl)porphyrin, cobalt tetra(bromophenyl)porphyrin, cobalt tetranitroporphyrin, cobalt tetracyanoporphyrin, iron tetraphenylporphyrin, iron tetratolylporphyrin, iron tetraxylylporphyrin, iron tetraanisylporphyrin, iron tetramesitylporphyrin, iron tetra(chlorophenyl)porphyrin, iron tetra(bromophenyl)porphyrin, iron tetranitroporphyrin, iron tetracyanoporphyrin, manganese tetraphenylporphyrin, manganese tetratolylporphyrin, manganese tetraxylylporphyrin, manganese tetraanisylporphyrin, manganese tetramesitylporphyrin, manganese tetra(chlorophenyl)porphyrin, manganese tetra(bromophenyl)porphyrin, cobalt phthalocyanine monosulfonate, cobalt phthalocyanine disulfonate, cobalt phthalocyanine trisulfonate, cobalt phthalocyanine tetrasulfonate, cobalt phthalocyanine monocarboxylate, cobalt phthalocyanine dicarboxylate, cobalt phthalocyanine tricarboxylate, cobalt phthalocyanine tetracarboxylate, tetrapropyl phthalocyanine, cobalt monochloro phthalocyanine, cobalt dichloro phthalocyanine, cobalt trichloro phthalocyanine, cobalt tetrachloro phthalocyanine, cobalt monobromo phthalocyanine, cobalt tribromo phthalocyanine, cobalt diiodo phthalocyanine, cobalt tetraiodo phthalocyanine, iron phthalocyanine monosulfonate, manganese phthalocyanine dicarboxylate, iron phthalocyanine tricarboxylate, manganese phthalocyanine tetracarboxylate, iron tetramethyl phthalocyanine, manganese tetraethyl phthalocyanine, iron tetrapropyl phthalocyanine, manganese monochloro phthalocyanine, iron dichloro phthalocyanine, manganese trichloro phthalocyanine, iron tetrachloro phthalocyanine, manganese monobromo phthalocyanine, iron tribromo phthalocyanine, manganese diiodo phthalocyanine, iron tetraiodo phthalocyanine, Bis[bis(diphenylphosphino)ethane]rhodium, Bis[bis(diphenylphosphino)ethane]iridium, chloro-carbonyl-bistriphenyl phosphine)iridium, chloro-carbonyl-bis(triphenylphosphine)rhodium, etc. It is to be understood that the aforementioned organometallic complexes are merely representative of the class of compounds which may be employed and that other organometallic complexes which will react reversibly with gases such as oxygen may also be employed, although not necessarily with equivalent results.

The other component of the facilitated gas enrichment membrane composite which provides a medium in which the organometallic complex which is capable of binding with gases such as oxygen in a reversible manner is incorporated or dispersed therein will comprise a polymeric material comprising an interpenetrating polymer network. This interpenetrating network which provides the matrix for the organometallic complex must possess certain characteristics which render the same operable as a matrix. For example, the polymeric network must be hydrophobic and nonacidic in character as well as possessing a low dielectric constant. The interpenetrating polymeric network must also possess a nitrogen ligand which serves both to stabilize and activate the organometallic complex. In addition, the matrix must also act as a medium in which the particles of the organometallic complex are isolated from one another in order that no interaction between the particles takes place. In the instant application, the interpenetrating polymeric network will comprise a host polymer and a guest polymer. A feature which distinguishes an interpenetrating network from similar blends of two or more polymers is the fact that at least one of the polymer components of the interpenetrating network is cross-linked to itself or to like components, but not to the other polymer or polymers. This unique crosslinking which is inherent to an interpenetrating polymer network system means that the polymers which comprise the components of the system are physically entangled or entwined but are not bound to one another by chemical bonds. For example, other polymer systems provide a chemical crosslinking or covalent bonding between the different types of polymer chains. In the preferred embodiment of the present invention, the host polymer comprises a nitrogen-containing compound and preferably a heterocyclic nitrogen-containing compound. Some specific examples of these host polymers will comprise poly(2-vinylpyridine), poly(4-vinylpyridine), derivatives of poly(4-vinylpyridine) such as the cyano-, amino-, and alkyl moieties containing from 1 to 4 carbon atoms such as poly(2-cyano-4-vinylpyridine), poly(2-amino-4-vinylpyridine), poly(2-methyl-4-vinylpyridine), poly(2-ethyl-4-vinylpyridine), poly(2-propyl-4-vinylpyridine), poly(2-butyl-4-vinylpyridine), etc., poly(N-vinylimidazole), poly(benzimidazole), poly(vinylbenzimidazole), imidazole-modified polyethyleneimine, imidazole-modified epiamine, poly(4-vinylpyridine-acrylonitrile), etc.

The guest polymer which forms the other component of the interpenetrating polymer network comprises an isocyanate-capped polymer such as poly[methylene poly(phenylisocyanate)], polymers prepared by reacting a polyglycol such as polyethylene glycol, polypropylene glycol or block copolymers containing both ethylene glycol and propylene glycol with an isocyanate containing compound such as toluenediisocyanate, methylenediphenylisocyanate, ethylenediphenylisocyanate, propylenediphenylisocyanate, etc. It is to be understood that the aforementioned nitrogen-containing compounds which comprise the host polymers and the isocyanate-capped polymers comprising the guest polymer in the interpenetrating polymer network are only representative of the type of compounds which may be employed and that others of this type may also be used in the present invention although not necessarily with equivalent results.

The formation of the isocyanate-capped polymer by reacting an isocyanate-containing compound with a polyether is usually effected at reaction conditions which include an elevated temperature in the range of from about 50° to about 100° C. and preferably at atmospheric pressure, although it is contemplated within the scope of this invention that, if so desired, superatmospheric pressures ranging from 2 to about 50 atmospheres may be employed. The average molecular weight of the isocyanate-capped polymer can be varied by utilizing varying molecular weight polyethers, block copolymers or capping agents. For example, one particular type of block copolymer of ethylene glycol and propylene glycol which may be employed comprises the polymer which contains about 20% ethylene glycol and about 80% propylene glycol, the block copolymer having a molecular weight of about 2750. However, it is to be understood that this is just one example of the type of block copolymer which may be employed and that other copolymers containing varied amounts of ethylene glycol and propylene glycol as well as varying molecular weights may also be employed. In the preferred embodiment of the invention, the reaction is effected under neat conditions, although if so desired, solvents such as chloroform, carbon tetrachloride, or any other organic solvent in which the compounds are soluble may also be employed.

When preparing the polymeric membrane component of the composite which is in the form of an interpenetrating network, the two polymers, which have been designated as the host polymer and the guest polymer, are dissolved in a mutually compatible solvent. When the two solutions are admixed, the chains of polymers become entwined. Then the admixed solution which also contains the metallic component in the form of an organometallic gas carrier is cast upon a porous backing support material. As the solvent is allowed to evaporate, the chains of the component polymers remain physically entwined. Inasmuch as this is only a physical interaction, it differs from prior polymeric membranes in that no chemical crosslinking or covalent bonding has taken place between the different types of polymer chains. After casting and evaporation of the solvent, the composite is then subjected to a curing agent which occurs in an atmosphere which may range from 0% relative humidity up to a high humidity or hydrous atmosphere which may reach 100% relative humidity. When exposed to this type of atmosphere, a portion of the isocyanate-capped polymer which, in this system, comprises the guest polymer will hydrolyze to form an amine-capped polymer. This portion of the amine-capped polymer will react with the remaining portion of the original isocyanate-capped polymer to form a cross-linked network which physically and permanently entwines or entangles the nitrogen-containing compound in the network. However, the nitrogen-containing compound which comprises the host polymer is neither chemically bonded nor cross-linked either to itself or to the polyurea polymer which results from the reaction of amine-capped polymer with isocyanate-capped polymer. Inasmuch as the nitrogen-containing compound or polymer is so entwined or entangled in the cross-linked polyurea polymer, it is no longer soluble and cannot be dissolved out of the interpenetrating network matrix, thus resulting in a polymeric membrane system which will remain physically stable during its continuous use as a gas separation membrane.

The formation of the novel gas enrichment membrane composite which, due to the combination of components making up the membrane, will exhibit excellent gas selectivity and flux characteristics, may be effected at operating conditions which include ambient temperature and atmospheric pressure. The composite is formed by dissolving the host polymer in an appropriate solvent. The choice of solvent which is to be employed in preparing the membrane composite will depend upon various factors. For example, the solvent must be capable of dissolving the host polymer and the guest polymer as well as, if so desired, the organometallic gas carrier, but will not dissolve the particular backing material which has been selected as a support material for the thin film composite membrane. After thoroughly admixing the host polymer comprising the nitrogen-containing compound, the resulting solution is then purged with an inert gas such as nitrogen. The organometallic compound is then added to the solution and the solution is mixed until a complete solution is obtained. Thereafter, the guest solution which is also dissolved in the solvent is admixed with the solution of host polymer and organometallic compound in a predetermined amount so that the resulting casting solution will contain the host polymer, guest polymer and organometallic compound in the desired amounts. An example of an appropriate solvent which may be employed in this process comprises nitromethane, although other solvents such as benzene, toluene, chloronitromethane, butyrolactone, methylpropylsulfone, etc.; mixed solvent systems such as nitromethane-methanol, nitromethaneethanol, nitromethane-isopropanol, etc. may also be employed. In the preferred embodiment of the invention, the host polymer comprising the nitrogen-containing compound will be present in the casting solution in an amount in the range of from about 0.10% to about 5.00%; the guest polymer comprising the isocyanate-capped polymer will be present in an amount in the range of from about 0.10% to 5.00% and the organometallic compound comprising the gas carrier will be present in an amount in the range of from about 0.0001% to about 0.10%.

The facilitated gas enrichment membrane composite of the present invention is then prepared by contacting a porous support member with the casting solution. The porous backing support member or material may comprise a polymer such as polysulfone, polyethylene, polypropylene, polyphenylether, cellulose nitrate, cellulose acetate, etc., the thickness of this porous support material being in a range of from about 0.01 to about 100.0 microns. It is also contemplated within the scope of this invention that, if so desired, the porous support member or material may be impregnated on a fabric which acts as a backing therefor, said backing member being either natural or synthetic in origin and either woven or nonwoven in configuration. Some specific examples of these backing members which may be employed will include natural fabrics such as canvas, cotton, linen, etc. or synthetic fabrics such as polyesters, either woven or nonwoven, Dacron, Nylon, Orlon, etc. The support member which is contacted with the solution may be either in a wet or dry state.

In one embodiment the composite membranes may be prepared by continuously forming a thin layer of the interpenetrating polymer matrix of the isocyanate-capped polymer and the nitrogen-containing polymer which contains the organometallic gas carrier directly on the finely porous surface of the support material by continuously passing one surface of the support material through the casting solution which contains the membrane-forming components. The thickness of the film of the polymer network matrix and the organometallic compound may be controlled by the concentration of the polymer network in the solution as well as by the rate of withdrawal of the support material from the solution. By utilizing this method of membrane preparation, it is possible to achieve several additional degrees of freedom beyond that which is possible when preparing a membrane according to more conventional methods. Some examples of these advantages will include an independent selection of materials constituting the finely porous support material, and independent preparation of the thin film and the porous support material whereby it is possible to optimize each component for its specific function, a reproductive variation in control over the thickness of the semipermeable barrier which is required to obtain the theoretical maximum in performance control over the porosity and perfection of the semipermeable barrier which is necessary to attain the theoretical semipermeability of the material, and the formation of the film directly on the finely porous surface of the support whereby said film is integrally bonded to the support member, thus permitting the finished membrane to withstand any back pressure which may be encountered in normal operation.

As an illustration of this continuous method of forming the facilitated gas enrichment membrane composite of the present invention, a finely porous backing support material may be prepared by casting the particular material on a casting machine from a solution. The solution will contain the finely porous backing support material such as polysulfone, cellulose acetate, etc. dissolved in a suitable solvent such as ketones, including acetone, methylethylketone, diethylketone, etc., alcohols including methyl alcohol, ethyl alcohol, n-propyl alcohol, isopropyl alcohol, etc. as well as a surfactant to increase the wettability of the components of the solution. The solution, after blending the various components thereof, is filtered to remove any foreign material by passing the solution through a filter medium under an atmospheric pressure which is usually afforded by the presence of an inert gas such as nitrogen and thereafter is degassed to remove any dissolved gas. The solution is then fed onto a casting belt and sprayed on said belt at a desired thickness by means which are present for controlling the thickness such as a casting knife. The freshly cast solution is carried on the belt into a gelation chamber which is maintained at a slightly elevated temperature in a range of from about 10° to about 30° C. After passage through this first gelation chamber wherein the surface pores, size and permeability of the membrane are controlled, the belt and the finely porous backing support material will pass into a second gelation chamber in which the properties of the support material are fixed. The temperature of the second gelation chamber is higher than that of the first gelation chamber in order to promote recovery of the solvent which may still be present. After passage from the second gelation chamber, the support material is recovered from the casting belt and passed to storage. Alternatively, after passage from the second gelation chamber, the backing support material may be contacted with the hereinafter described casting solution containing the mixture of polymers and organo-metallic compound while in a wet state.

The backing support material which, if so desired, may be backed by a fabric of the type hereinbefore set forth is then continuously passed through a casting solution containing the interpenetrating polymer network of the isocyanate-capped polymer and nitrogen-containing component as well as the organometallic gas carrier, said network and carrier being dissolved in an appropriate solvent. As was previously mentioned, the particular organic solvent which is employed will comprise the type of solvent which will dissolve the membrane-forming interpenetrating polymer network and organometallic compound, but will not be of the type which will dissolve or solubilize the porous backing support material; thus it is apparent that the particular solvent which is employed will depend upon both the make-up of the interpenetrating polymer network and the particular backing support material which is to be used.

The polymer blend of the isocyanate-capped polymer and the nitrogen-containing component will be present in the casting solution in an amount in the range of from about 0.1 to about 5.0% by weight of the solution while the organometallic gas carrier will be present in an amount in the range of from about 0.0001% to about 0.10% by weight of said solution, the amount of polymer blend present in the solution being dependent upon the desired thickness of the semipermeable membrane which is to be prepared. The solution is placed in a container or apparatus which is provided with a roller extending into the solution but not completely immersed therein. The porous backing support material is continuously passed into the solution containing the components of the gas enrichment membrane composite in such a manner so that the support material travels under the roller, one side of said support material being in contact with the roller. Inasmuch as one side of the support material is in contact with the roller, only the other side of the support material is in contact with the solution. The feed of the support backing material through the solution and the rate of withdrawal therefrom may range from about 0.1 to about 50.0 ft. per min., said rate again being dependent upon the thickness of the film which is desired to coat the backing support material.

After continuously withdrawing the polymer blend coated support material from the solution, the resulting composite membrane is cured by exposure to a hydrous atmosphere by passage through a curing zone. The curing in said zone is effected at a temperature in the range of from about ambient (20°–25° C.) up to about 100° C. while maintaining the atmosphere in the curing zone at a relative humidity which will range from about 0% to about 100%. The curing of the membrane will be effected for a period of time which will range from about five minutes to about 48 hours in duration, the time of curing being dependent upon the various parameters such as temperature and humidity. In any instance, the time will be sufficient to generate a substituted amine thereby converting a portion of the isocyanate-capped polymer to an amine-capped polymer. As was hereinbefore set forth, the remaining portion of the isocyanate-capped polymer will react with the amine-capped polymer to form a reaction product comprising a crosslinked network, physically and permanently entwining the host polymer comprising the heterocyclic nitrogen-containing compound in said network. This membrane can then be passed, if so desired, through a second curing chamber with a relative humidity of 0% at temperatures in the range of ambient (20°–25° C.) to 100° C., for a period of five minutes to 48 hours duration.

The following examples are given for purposes of illustrating the novel facilitated gas enrichment membrane composites as well as the process for the preparation of these composites. However, it is to be understood that the examples are given merely for purposes of illustration, and that the present invention is not necessarily limited thereto.

EXAMPLE I

A polymeric membrane of the present invention was prepared by charging 94.5 grams (0.90 moles) of 4-vinylpyridine, 72.0 grams (1.36 moles) of acrylonitrile and 1.80 grams (0.011 moles) of an initiator comprising azoisobutyronitrile (AIBN) to a one liter flask which was equipped with a mechanical stirrer, condenser, addition funnel, thermometer, nitrogen purge and drying tube. The stirred reaction mixture was slowly heated to a temperature of 70° C., maintained thereat for a period of 25 minutes and thereafter was cooled in an icewater bath. The solid polymer was taken up in dimethyl formamide and coagulated by the addition of a 0.3% aqueous ammonia solution. After drying the polymer for a period of 16 hours in a vacuum oven, 100 grams of a slightly yellow polymer was recovered. The composition of the polymer was 69.60% 4-vinylpyridine and 30.40% acrylonitrile.

The organometallic portion of the membrane composite was prepared by dissolving 0.5 grams of tetraphenylporphyrin and 0.25 gram of cobalt acetate in 100 ml of glacial acidic acid in a flask which was then refluxed for a period of 10 minutes. The reaction mixture was allowed to cool to room temperature following which the cooled reaction mixture was taken up in 150 ml of water and extracted with benzene. The benzene solution was washed three times with water and once with a 1N ammonium chloride solution which was used to break up the emulsion. The organic phase of the solution was dried over sodium sulfate, filtered and concentrated on a rotary evaporator. The resulting cobalt(II)-tetraphenylporphyrin Co(II)TPP] was dried for a period of 16 hours in a vacuum dessicator to yield 0.40 gram of the organometallic compound.

Casting solutions were prepared by dissolving varying amounts of the vinylpyridine-acrylonitrile polymer [P(4VP-AN)] in nitromethane and adding the cobalt tetraphenylporphyrin to the solution followed by admixing until a complete solution of the metalloporphyrin occurred. Following this, a solution of poly[methylene poly(phenylisocyanate)] (PMDI) dissolved in nitromethane was admixed with the first solution and the resulting admixture was purged with nitrogen. The solution was then cast on a wet polysulfone sheet which was affixed to a sheet of glass. After allowing the solution to remain on the polysulfone sheet for a period of one minute, the excess solution was drained and the membrane composite was allowed to dry in air. The composite was then cured in an incubator at a temperature of 50° C. in a hydrous atmosphere which possessed a relative humidity of 93% for a period of 18 hours followed by a final cure at a temperature of 70° C. in an atmosphere of 0% relative humidity for a period of three hours.

EXAMPLE II

Another gas enrichment membrane composite was prepared in which a polymer comprising an interpenetrating polymer network consisting of poly(4-vinylpyridine-acrylonitrile)[4VP-AN)] was prepared in a manner similar to that set forth in Example I above. The organometallic portion of the composite consisting of cobalt(II)tetra(p-anisole)porphyrin[Co(11)TAP] was prepared by dissolving 0.5 grams of tetra(p-anisole)porphyrin and 0.50 gram of cobalt acetate in a solution of 100 mL of acetic acid and 250 ml of chloroform in a flask equipped with a condenser. The reaction mixture was heated to reflux and maintained thereat for 15 minutes following which the mixture was cooled and added to 200 ml of water. The aqueous phase of the solution was washed with benzene and the benzene and chloroform solutions were combined. The organic portion of the solution was washed four times with water and twice with 1N ammonium chloride solution. Following the washing, the organic phase was dried over sodium sulfate, filtered and concentrated on a rotary evaporator. The crude product was chromatographed on a talc column utilizing chloroform as the eluent. The first red band was collected and freed of solvent to yield, upon drying, 0.28 gram of Co(II)TAP.

The membrane casting procedure similar to that set forth in Example I was employed to prepare a gas enrichment membrane composite containing Co(II)TAP as the gas carrier and an interpenetrating polymer network matrix consisting of P(4VP-AN) as the host polymer and PMDI as the guest polymer.

EXAMPLE III

A gas enrichment membrane composite was prepared in a manner similar to that set forth in the above examples in which the interpenetrating polymer network matrix comprised P(4VP-AN) and PMDI while the organometallic gas carrier comprised Cobalt(II)octaethylporphyrin[Co(II)OEP].

EXAMPLE IV

The membranes which were prepared according to the above examples, the components of the host, guest polymers and gas carrier being present in varying amounts which are hereinafter set forth in greater detail, were utilized in a gas enrichment experiment by loading the membranes into a stainless steel gas test cell which had an effective membrane diameter of 42 mm and an area of 13.2 square cm. The cells were provided with a gas inlet for the feed gas and an outlet port for the gas permeate. In addition, the cells were operated with a dynamic gas with an approximate rate of air of 100 cc/min. and a maximum gas pressure of 90 psi. The membranes were analyzed with pure air as the feed gas having a composition of approximately 21% $O_2$ and 79% $N_2$. In the following examples, the oxygen enrichment or selectivity of the feed ratio of the permeate gas to the air is expressed in the following equation:

$$\alpha O_2/N_2 = \frac{(O_2/N_2)_{permeate}}{(O_2/N_2)_{air}}$$

In addition, the flux $\Phi$ is reported as $cm^3/(cm^2 \, sec \, psi)$. It is noted that the oxygen selectivity tests were performed at varying pressures and varying temperatures.

In the first series of experiments, gas enrichment compositions were utilized using only a guest polymer as the membrane or an interpenetrating network polymer as the membrane. The results of this series of tests which were run at 25° C. are set forth in Table 1 below:

TABLE 1

| Membrane Composition (wt. percent) | | α $O_2/N_2$ | $\Phi \times 10^6$ |
|---|---|---|---|
| PMDI | P(4VP-AN) | | |
| 0.00 | 2.00 | 1.00 (10 psi) | 130.3 |
| | | 1.00 (20 psi) | 124.1 |
| | | 1.00 (50 psi) | 136.1 |
| 0.00 | 2.00 | 1.01 (10 psi) | 111.1 |
| | | 1.03 (20 psi) | 120.1 |
| | | 1.03 (50 psi) | 142.9 |
| 0.40 | 0.10 | 1.25 (10 psi) | 5.53 |
| | | 1.62 (50 psi) | 6.36 |
| | | 1.66 (90 psi) | 8.24 |
| 0.40 | 0.20 | 1.19 (50 psi) | 6.36 |
| | | 1.18 (75 psi) | 11.72 |
| | | 1.22 (90 psi) | 15.36 |
| 1.04 | 0.40 | 1.50 (50 psi) | 3.64 |
| | | 1.54 (90 psi) | 4.63 |
| 0.80 | 0.10 | 1.30 (50 psi) | 5.30 |
| | | 1.31 (90 psi) | 11.79 |
| 2.50 | 0.40 | 1.53 (50 psi) | — |

It is to be noted from the above table that the membrane which was prepared from only the guest polymer did not exhibit any oxygen selectivity while the membrane prepared from the interpenetrating polymer network possessed only a very slight oxygen enrichment property.

EXAMPLE V

In this example, a facilitated gas enrichment membrane composite was prepared utilizing, as the oxygen carrier, Co(II) TPP. Again, the series of experiments were performed at a temperature of 25° C. The results of these experiments are set forth in Table 2 below:

TABLE 2

| Membrane Composition (wt. percent) | | | | |
|---|---|---|---|---|
| PMDI | P(4VP-AN) | Co(II)TPP | $\alpha\ O_2/N_2$ | $\Phi \times 10^6$ |
| 0.00 | 1.00 | 0.0038 | 1.00 (10 psi) | 288.0 |
| | | | 1.01 (20 psi) | 522.0 |
| 0.40 | 0.20 | 0.00052 | 2.78 (50 psi) | 0.91 |
| | | | 3.17 (75 psi) | 1.28 |
| | | | 3.80 (90 psi) | 1.43 |
| 0.54 | 0.40 | 0.001 | 2.91 (50 psi) | 0.99 |
| | | | 4.22 (75 psi) | 0.59 |
| | | | 3.65 (90 psi) | 0.69 |
| 0.68 | 0.40 | 0.001 | 1.67 (50 psi) | 4.02 |
| | | | 1.68 (75 psi) | 4.34 |
| | | | 1.59 (90 psi) | 4.46 |
| 1.08 | 0.40 | 0.0015 | 2.28 (90 psi) | 1.40 |

It is to be noted from the above table that the novel gas enrichment membrane composites of the present invention possessed an excellent oxygen enrichment factor while at the same time providing an adequate flux.

EXAMPLE VI

As an illustration of the thermal stability of the facilitated gas enrichment membrane composites of the present invention, a further series of experiments were performed in which the membrane was subjected to varying pressures and temperatures. The gas enrichment membrane composite which was utilized contained in the casting solution 0.40% PMDI, 0.20% P(4VP-AN) and 0.00052% Co(II)TPP. Two membrane composites were tested at temperatures of 25°, 40° and 60° respectively. The results of these tests are set forth in Table 3 below in which the two membranes were classified A and B.

TABLE 3

| Membrane | T (°C.) | 50 psi | | 75 psi | | 90 psi | |
|---|---|---|---|---|---|---|---|
| | | $\alpha\ O_2/N_2$ | $\Phi \times 10^6$ | $\alpha\ O_2/N_2$ | $\Phi \times 10^6$ | $\alpha\ O_2/N_2$ | $\Phi \times 10^6$ |
| A | 25 | 2.43 | 1.06 | 2.82 | — | 2.72 | 1.09 |
| | 40 | 3.05 | 1.06 | 3.61 | 1.42 | 3.39 | 1.34 |
| | 60 | 3.15 | 1.67 | 3.06 | 2.12 | 2.47 | 3.28 |
| B | 25 | 1.83 | 1.97 | 1.75 | — | 1.74 | 2.27 |
| | 40 | 1.91 | 2.12 | 1.98 | 2.73 | 2.01 | 2.69 |
| | 60 | 2.21 | 2.88 | 2.53 | 2.93 | 2.51 | 3.11 |

EXAMPLE VII

In this example, a series of membranes were prepared utilizing various ratios of guest polymer, host polymer and organometallic oxygen carrier. The ratio of host polymer to guest polymer varied from 0.5:1 to 1.5:1 while the amount of organometallic compound, which comprised cobalt(II)tetra(p-anisole)porphyrin[Co(II)-TAP], ranged from 0.0076 to 0.023%. The results of these tests are set forth in Table 4 below in which the various membranes labeled C, D, and E were tested at pressures ranging from 20 psi to 90 psi.

TABLE 4

| Membrane | PMDI | P(4VP-AN) | Co(II)TAP | $\alpha\ O_2/N_2$ | $\Phi \times 10^6$ |
|---|---|---|---|---|---|
| C | 0.60 | 0.30 | 0.00764 | 1.17 (20 psi) | 1.87 |
| | | | | 1.27 (50 psi) | 2.23 |
| | | | | 1.29 (75 psi) | 2.42 |
| | | | | 1.30 (90 psi) | 2.46 |
| D | 0.60 | 0.60 | 0.015 | 2.43 (50 psi) | 0.73 |
| | | | | 2.77 (75 psi) | 0.86 |
| | | | | 2.94 (90 psi) | 0.77 |
| E | 0.60 | 0.90 | 0.023 | 2.35 (50 psi) | 0.74 |
| | | | | 2.50 (75 psi) | 0.82 |
| | | | | 2.66 (90 psi) | 0.78 |

It is to be noted that membranes D and E exhibited good oxygen selectively as well as an adequate flux.

EXAMPLE VIII

To illustrate the use of a different organometallic oxygen carrier, a membrane composite was prepared in a manner similar to that set forth in Example I above utilizing cobalt(II)octaethylporphyrin[Co(II)-OEP]. The resultant membrane was tested at pressures ranging from 50 psi to 90 psi at a temperature of 25° C. The results of these tests are set forth in Table 5 below which show that a relatively good oxygen selectively with a relatively high flux was obtained by the use of these membranes.

TABLE 5

| Membrane Composition (wt. percent) | | | | |
|---|---|---|---|---|
| PMDI | P(4VP-AN) | Co(II)OEP | $\alpha\ O_2/N_2$ | $\Phi \times 10^6$ |
| 0.40 | 0.20 | 0.0008 | 1.76 (50 psi) | 5.46 |
| | | | 1.83 (75 psi) | 5.41 |
| | | | 1.83 (90 psi, 24 hrs.) | 5.31 |
| | | | 1.65 (90 psi, 48 hrs.) | 6.55 |
| | | | 1.62 (90 psi, 72 hrs.) | 6.72 |

EXAMPLE IX

The following example further illustrates the use of a different organometallic oxygen carrier. In this example, a gas enrichment composite was prepared according to the method set forth in the above examples, the composite being prepared from a casting solution which contained varying amounts of host polymer, guest polymer and organometallic compound. The organometallic compound which was used in this example comprised cobalt(II)tetra(p-anisole)porphyrin(Co(II)TAP). The membranes which were prepared were then used in a stainless steel test cell similar in nature to that which was described in Example IV above. The membranes were analyzed in a manner also similar to that set forth in Example IV with the following results:

TABLE 6

| Membrane | PMDI | P(4VP-AN) | Co(II)TAP | α O$_2$/N$_2$ | Φ × 10$^6$ |
|---|---|---|---|---|---|
| F | 0.60 | 0.60 | 0.015 | 2.69 (50 psi) | 0.54 |
|   |      |      |       | 3.24 (75 psi) | 0.61 |
|   |      |      |       | 3.53 (90 psi) | 0.58 |
| G | 0.60 | 0.90 | 0.023 | 2.56 (50 psi) | 0.68 |
|   |      |      |       | 2.92 (75 psi) | 0.67 |
|   |      |      |       | 3.26 (90 psi) | 0.60 |

We claim as our invention:

1. A facilitated gas enrichment membrane composite which comprises an organometallic gas carrier interdispersed within an interpenetrating polymer network matrix, said interpenetrating polymer network matrix being comprised of (1) an isocyanate-capped polymer physically entwined with (2) a nitrogen-containing polymer, said component (1) being physically entwined with component (2) by means of a substituted polyurea, said polyurea being formed by the curing of said membrane at a temperature in the range of from about ambient to about 100° C. in an atmosphere which possesses relative humidity in the range of from about 0% to about 100% for a period of time sufficient to generate an amine-capped polymer by the hydrolysis of a portion of said isocyanate-capped polymer, with said amine-capped polymer subsequently reacting with a portion of the isocyanate groups present in said membrane to form a substituted polyurea which serves to physically entwine said component (2) in said membrane, said organometallic gas carrier being interdispersed within said interpenetrating polymer network, capable of reversible reaction with oxygen or other gases and comprising a transition metal complexed with an organic compound selected from the group consisting of porphyrins, phthalocyanines, derivatives thereof and phosphorus complexes.

2. The gas enrichment membrane composite as set forth in claim 1 in which said interpenetrating polymer network is nonacidic and hydrophobic in nature.

3. The gas enrichment membrane composite as set forth in claim 1 in which said interpenetrating polymer network possesses a low dielectric constant.

4. The gas enrichment membrane composite as set forth in claim 1 in which said organometallic gas carrier is in particulate form.

5. The gas enrichment membrane composite as set forth in claim 1 in which the metallic portion of said organometallic gas carrier is selected from the group consisting of cobalt, iron, manganese, iridium, and rhodium.

6. The gas enrichment membrane composite as set forth in claim 1 in which said composite is supported on a porous backing support material.

7. The gas enrichment membrane composite as set forth in claim 6 in which said porous backing support material comprises polysulfone.

8. The gas enrichment membrane composite as set forth in claim 6 in which said, porous backing support material comprises polyethylene.

9. The gas enrichment membrane composite as set forth in claim 1 in which said organometallic gas carrier comprises cobalt(II)tetraphenylporphyrin and said interpenetrating polymer network comprises the reaction product of poly[methylene poly(phenylisocyanate)] physically entwined with poly(4-vinylpyridine-acrylonitrile).

10. The gas enrichment membrane composite as set forth in claim 1 in which said organometallic gas carrier comprises cobalt(II)tetra(p-anisole)porphyrin and said interpenetrating polymer network comprises the reaction product of poly[methylene poly(phenylisocyanate)] physically entwined with poly(4-vinylpyridine-acrylonitrile).

11. The gas enrichment membrane composite as set forth in claim 1 in which said organometallic gas carrier comprises iron(II)tetraphenylporphyrin and said interpenetrating polymer network comprises the reaction product of poly[methylene poly(phenylisocyanate)] physically entwined with poly(4-vinylpyridine-acrylonitrile).

12. The gas enrichment membrane composite as set forth in claim 1 in which said organometallic gas carrier comprises cobalt phthalocyanine tetracyanate and said interpenetrating polymer network comprises the reaction product of poly[methylene poly(phenylisocyanate)] physically entwined with poly(4-vinylpyridine-acrylonitrile).

13. The gas enrichment membrane composite as set forth in claim 1 in which said organometallic gas carrier comprises manganese(II)octoethylporphyrin and said interpenetrating polymer network comprises the reaction product of isocyanate-capped polyethylene glycol physically entwined with poly(4-vinylpyridine).

14. A process for the production of a facilitated gas enrichment membrane composite comprised of an organometallic gas carrier interdispersed within an interpenetrating polymer network matrix, which process comprises admixing an isocyanate-capped polymer with a nitrogen-containing polymer in a mutually miscible solvent together with an organometallic gas carrier capable of reversible reaction with oxygen or other gases and comprising a transition metal complexed with an organic compound selected from the group consisting of porphyrins, phthalocyanines, derivatives thereof and phosphorus complexes to form an interpenetrating polymer network membrane having said organometallic gas carrier interdispersed therein, casting said membrane on a porous backing support material, curing the resultant composite at a temperature in the range of from about ambient to about 100° C. in an atmosphere which possesses a relative humidity in the range of from about 0% to about 100% for a period of time sufficient to generate an amine-capped polymer by the hydrolysis of a portion of said isocyanate-capped polymer, with said amine-capped polymer subsequently reacting with a portion of the isocyanate groups present in said membrane to form a substituted polyurea which serves to physically entwine said nitrogen-containing polymer in said membrane, and recovering the resultant composite interpenetrating polymer network membrane.

15. The process as set forth in claim 14 in which said addition conditions include ambient temperature and atmospheric pressure.

16. The process as set forth in claim 14 in which said nitrogen-containing organic compound comprises poly(4-vinylpyridine-acrylonitrile), said organometallic gas carrier comprises cobalt(II)tetraphenylporphyrin, and said isocyanate-capped polymer comprises poly[methylene poly(phenylisocyanate)].

17. The process as set forth in claim 14 in which said nitrogen-containing organic compound comprises poly(4-vinylpyridine-acrylonitrile), said organometallic gas carrier comprises cobalt(II)tetra(p-anisole)porphyrin, and said isocyanate-capped polymer comprises poly[methylene poly(phenylisocyanate)].

18. The process as set forth in claim 14 in which said nitrogen-containing organic compound comprises poly(4-vinylpyridine-acrylonitrile), said organometallic gas carrier comprises iron(II)tetraphenylporphyrin, and said isocyanate-capped polymer comprises poly[methylene poly(phenylisocyanate)].

19. The process as set forth in claim 14 in which said nitrogen-containing organic compound comprises poly(4-vinylpyridine-acrylonitrile), said organometallic gas carrier comprises cobalt phthalocyanine tetrasulfonate, and said isocyanate-capped polymer comprises poly[methylene poly(phenylisocyanate)].

20. The process as set forth in claim 14 in which said nitrogen-containing organic compound is poly(4-vinylpyridine), said organometallic gas carrier comprises manganese(II)octaethylporphyrin and said isocyanate-capped polymer comprises isocyanate-capped polyethylene glycol.

21. The process as set forth in claim 14 in which said porous backing support material comprises polysulfone.

22. The process as set forth in claim 14 in which said porous backing support material comprises polyethylene.

* * * * *